F. H. BRATZEL.
FRUIT PICKER.
APPLICATION FILED NOV. 25, 1912.
1,083,053.
Patented Dec. 30, 1913.
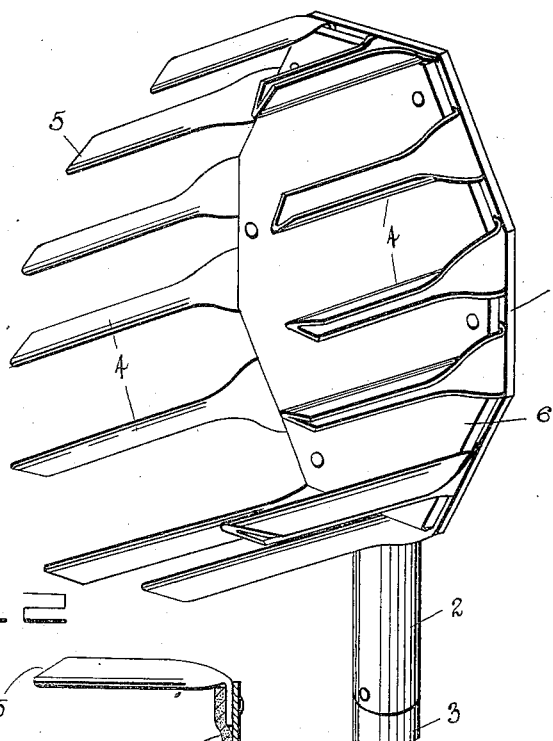
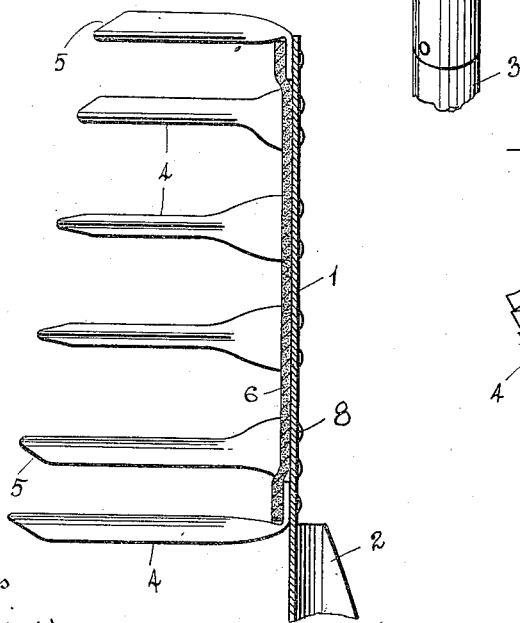
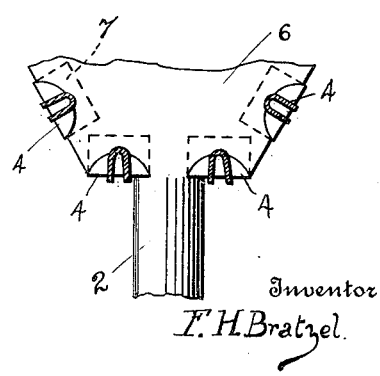
Inventor
F. H. Bratzel.
Witnesses
E. D. Haines.
C. E. Hunt.
By H. B. Willson & Co.
Attorneys

UNITED STATES PATENT OFFICE.

FREDRICK H. BRATZEL, OF GRESHAM, OREGON.

FRUIT-PICKER.

1,083,053.  Specification of Letters Patent.  Patented Dec. 30, 1913.

Application filed November 25, 1912. Serial No. 733,497.

*To all whom it may concern:*

Be it known that I, FREDRICK H. BRATZEL, a citizen of the United States, residing at Gresham, in the county of Multnomah and State of Oregon, have invented certain new and useful Improvements in Fruit-Pickers; and I do declare the following to be a full, clear, and exact description of the invention, such as will enable others skilled in the art to which it appertains to make and use the same.

This invention relates to improvements in fruit pickers.

One object of the invention is to provide a fruit picker having an improved construction and arrangement of fruit grasping or engaging fingers by means of which fruit hanging at any angle or in any position may be conveniently reached and removed by the picker.

Another object is to provide a fruit picker which will be simple, strong, durable and inexpensive in construction, efficient and reliable in operation and well adapted to the purpose for which it is designed.

With these and other objects in view, the invention consists of certain novel features of construction and the combination and arrangement of parts as will be more fully described and claimed.

In the accompanying drawings: Figure 1 is a perspective view of my improved fruit picker; Fig. 2 is a central vertical section thereof; Fig. 3 is a detail sectional view of a portion of the lower end of the picker.

My improved fruit picker comprises a vertically disposed plate 1 which may be of any suitable size and shape and which is preferably formed of sheet metal but may be constructed of any suitable material. In the present instance the plate 1 is shown as being of octagonal shape and as having formed integral with its lower end a handle socket 2 with which is adapted to be engaged a handle 3 of suitable length to permit fruit hanging in different parts of a tree to be readily reached by the picker.

Arranged around the edge of the plate 1 and projecting at substantially right angles from one side thereof are fruit engaging or grasping members which are also preferably formed of sheet metal strips each of which has its inner end bent inwardly at right angles into a base plate 7 riveted or otherwise securely fastened at 8 to the side of the plate 1 and its outer portion bent or folded longitudinally into a finger 4 of V-shaped cross section as shown. The fingers 4 when thus constructed are arranged on the plate 1 with the angle of each disposed inward where it will come into engagement with the fruit, so that the fruit when grasped or engaged by the fingers will not be cut or bruised. The outer ends of the fingers are preferably beveled or cut off at an angle toward the outer edges of the fingers as shown at 5 thus permitting the fingers to be readily forced in between close or thickly branched parts of the trees.

It will be noted that the fingers increase in length from the upper toward the lower edge of the plate 1, this construction of the fingers being adapted so that the fruit picked or detached from the branches by the upper fingers will drop into the lower portion of the picker and onto the longer fingers. The latter therefore constitute a basket in which the fruit rests or is retained until the picker is lowered and the fruit taken therefrom or deposited thereby into a suitable receptacle.

In order to obviate all danger of bruising soft or tender fruit by contact thereof with the plate 1 I preferably provide said plate with a lining or pad 6 of any suitable material which is secured to the plate 1 over the face plates 7 of the several fingers in any suitable manner and which forms a cushion overlying said plates and all the angles thereof.

In using the picker the same is projected in between the limbs of the tree and into engagement with the fruit or between the latter and the branch on which the same hangs whereupon when a slight thrust or pull is imparted to the picker the fruit will be removed from the branch and will drop into the lower or basket portion of the picker as hereinbefore described. By providing a series of picking fingers entirely around the plate 1 it will be seen that fruit hanging at any angle or position may be readily engaged by the fingers on one side or the other of the picker.

From the foregoing description taken in connection with the accompanying drawings, the construction and arrangement of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The herein described fruit picker comprising an upright octagonal plate having a tubular handle-socket projecting from its lower edge, a series of sheet metal picking members whereof each includes a flat base riveted to the face of said plate and a finger of V-shaped cross section bent from the outer edge of said base at right angles to the plane of the plate with the angle of the V disposed toward the center of the plate and its sharp edges adjacent the edge of said plate, the lowermost fingers being appreciably longer than the others and constituting a receptacle for the picked fruit, and a pad secured to said plate and overlying the flat bases of the fingers substantially as described.

In testimony whereof I have hereunto set my hand in presence of two subscribing witnesses.

FREDRICK H. BRATZEL.

Witnesses:
LAURA V. BULKELEY,
C. J. LUNDQUIST.

---

Copies of this patent may be obtained for five cents each, by addressing the "Commissioner of Patents, Washington, D. C."